Sept. 9, 1941.     J. J. N. VAN HAMERSVELD     2,255,199
MACHINE TOOL
Filed Feb. 6, 1939      9 Sheets-Sheet 1
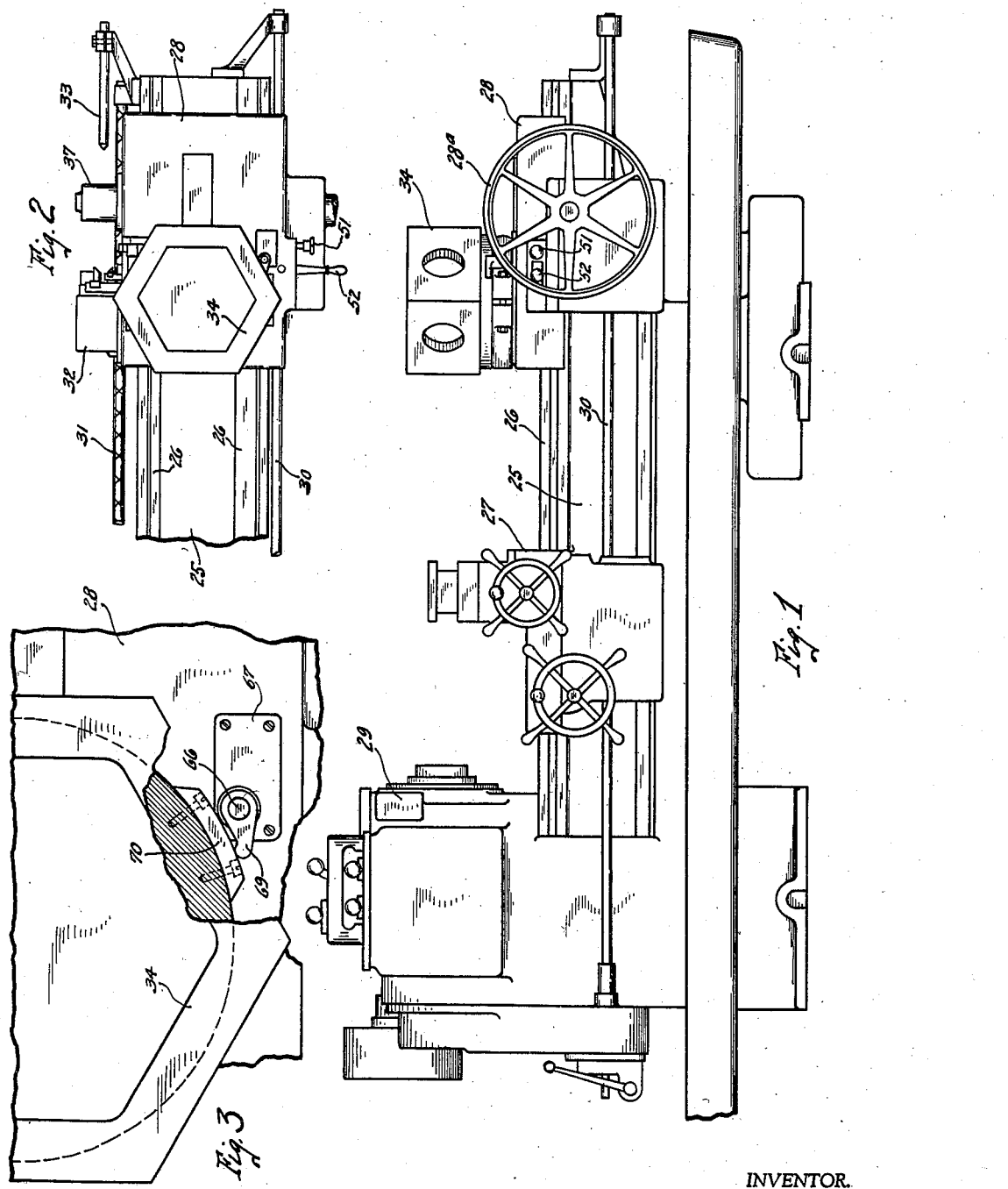
INVENTOR.
John J.N. Van Hamersveld
BY Kwis Hudson & Kent
ATTORNEYS

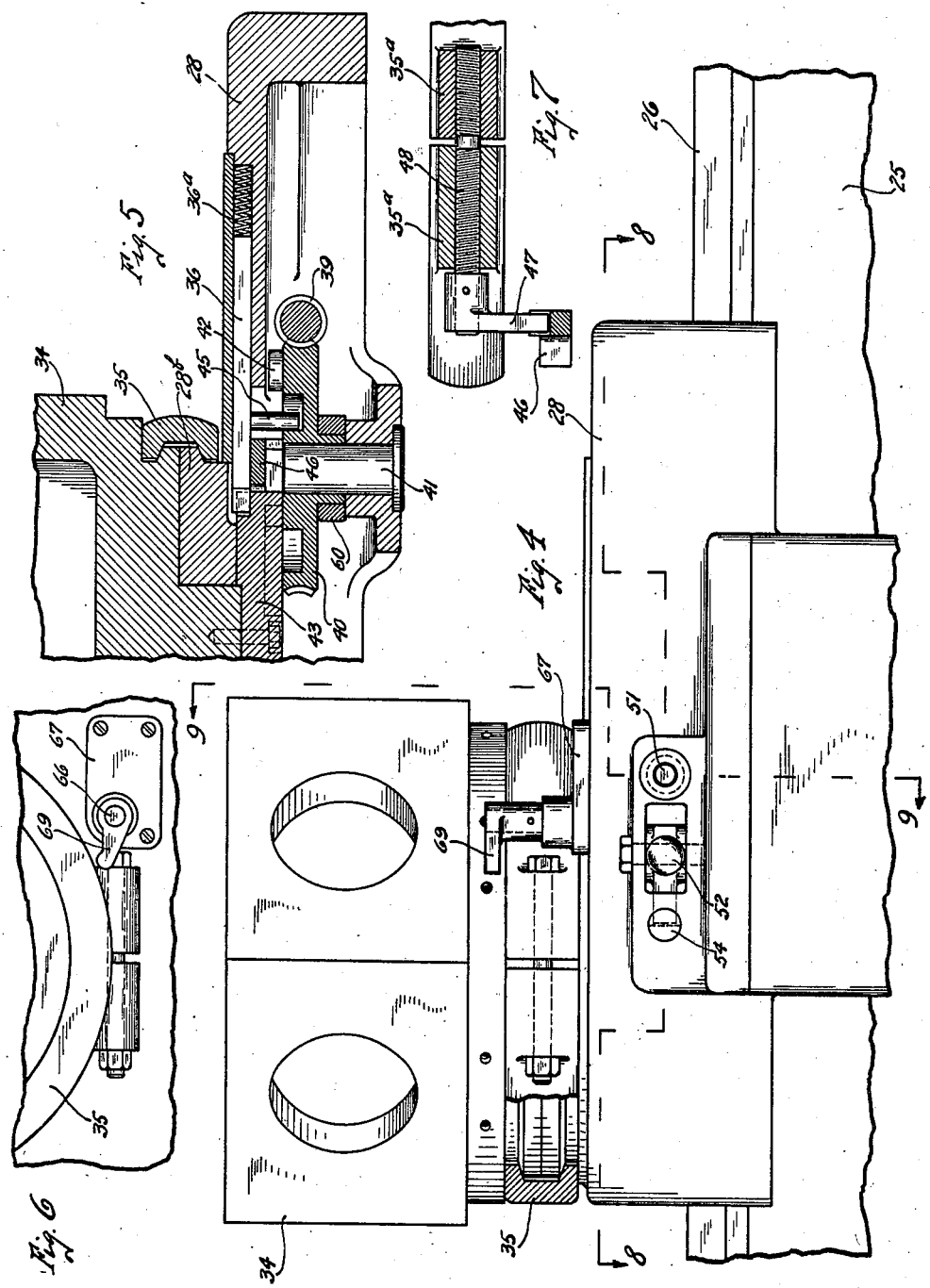

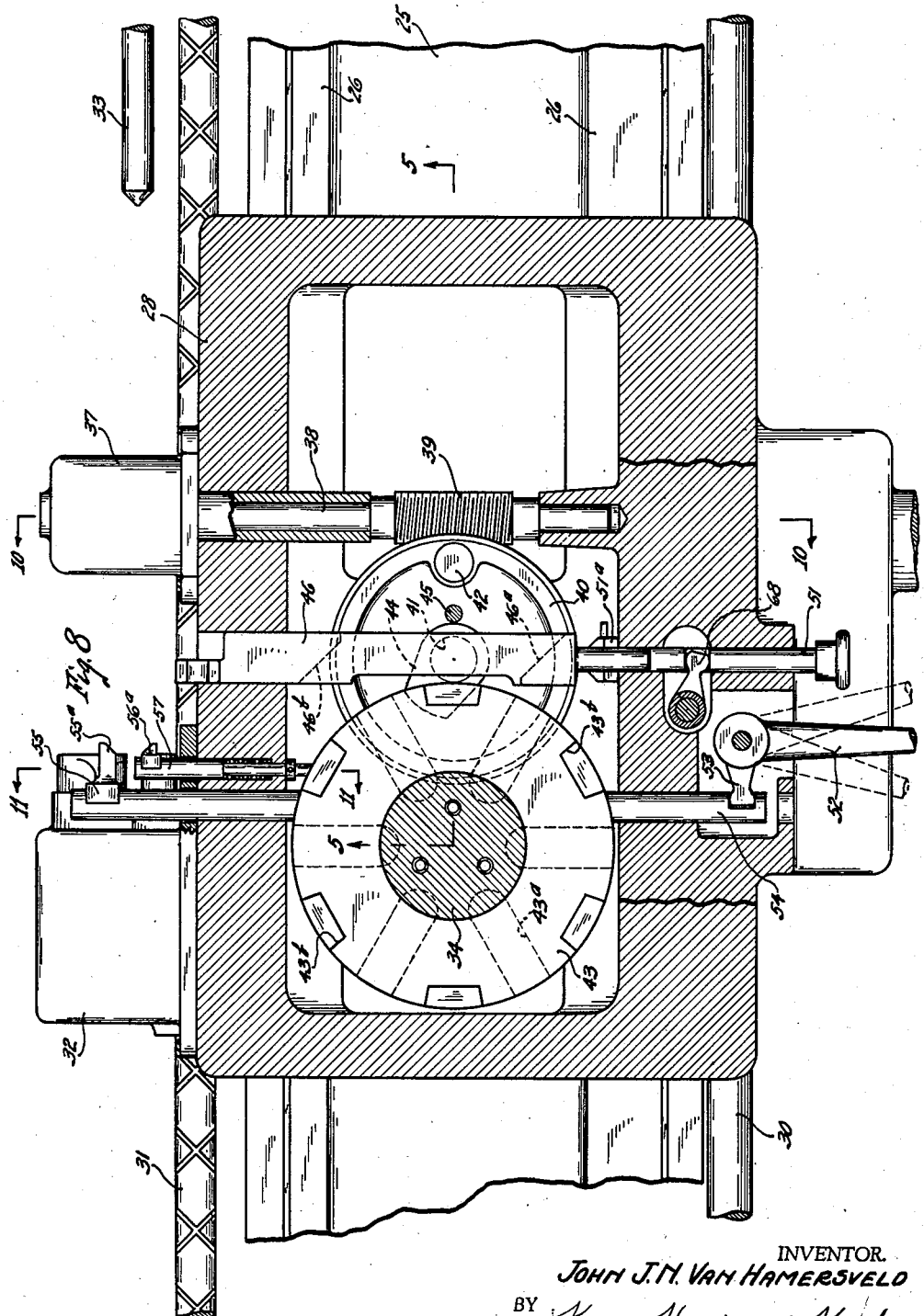

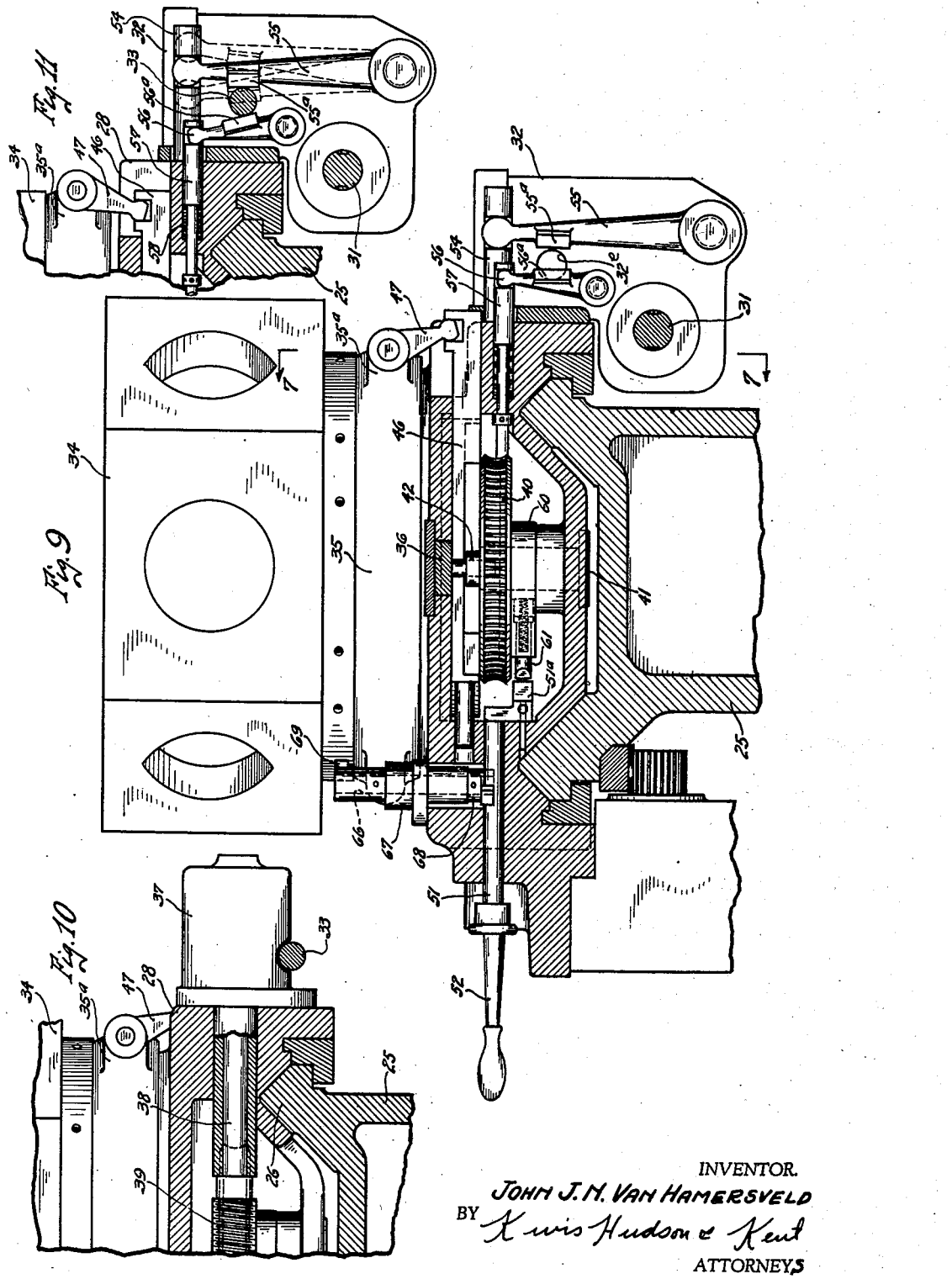

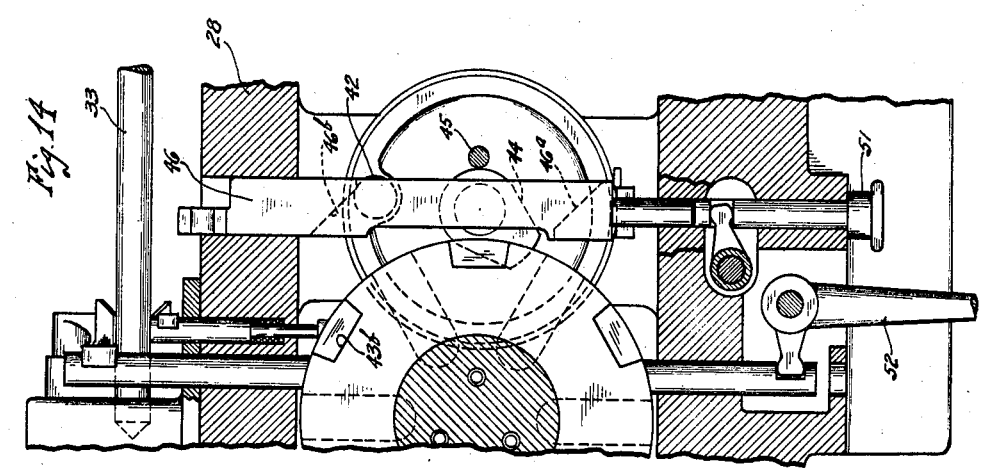
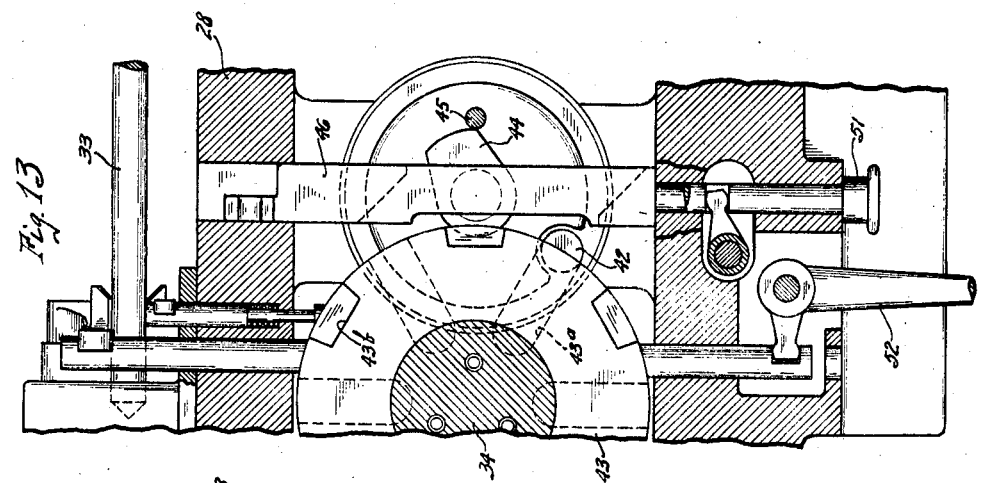
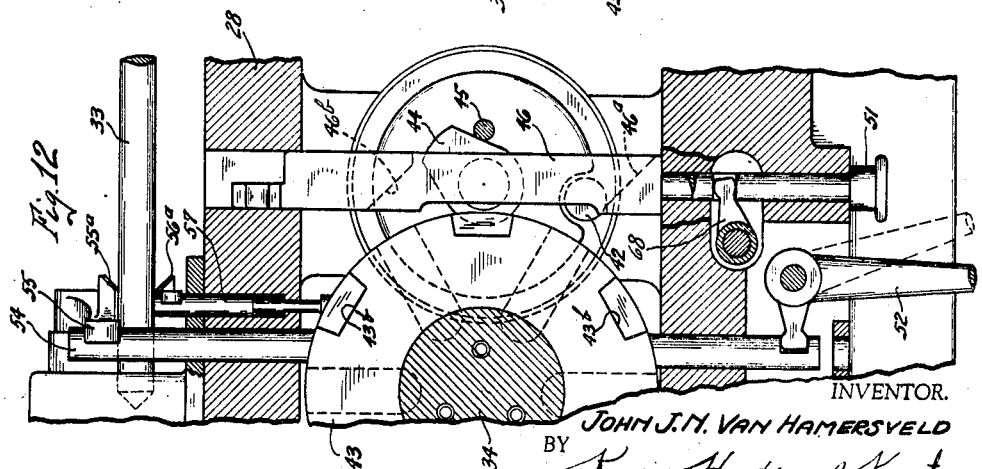

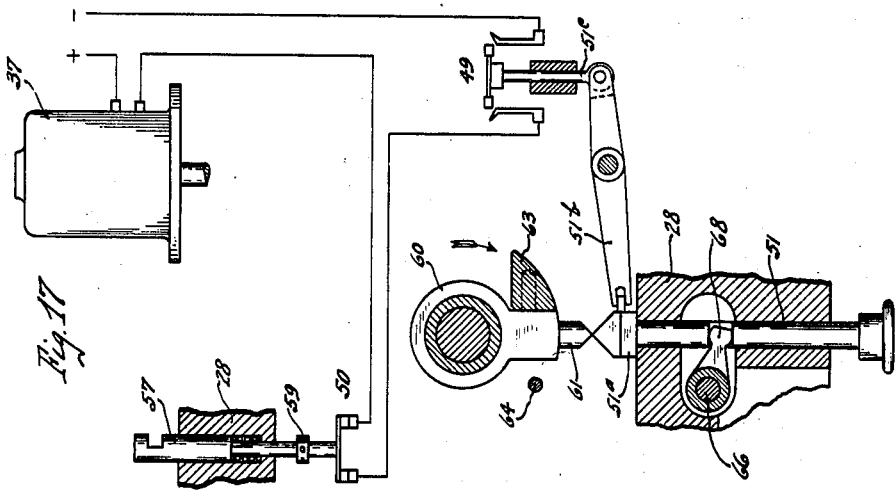
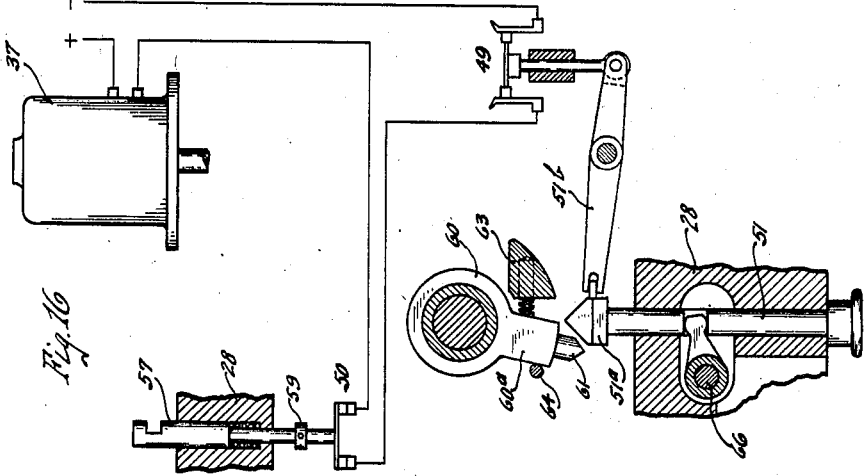
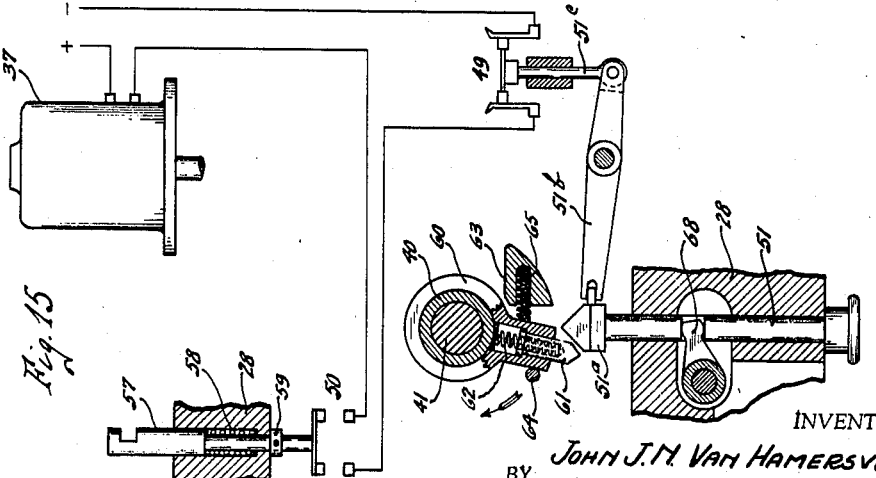

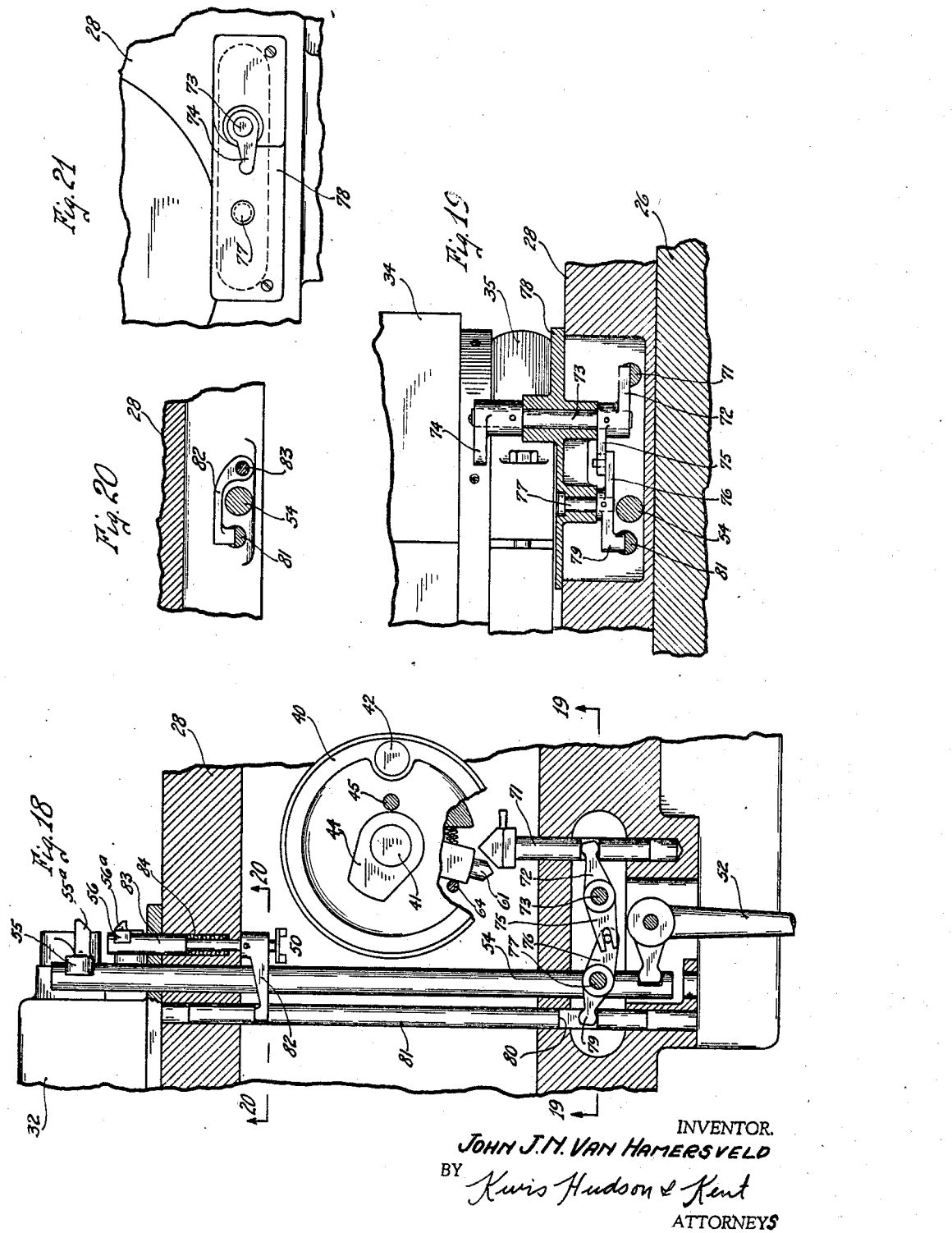

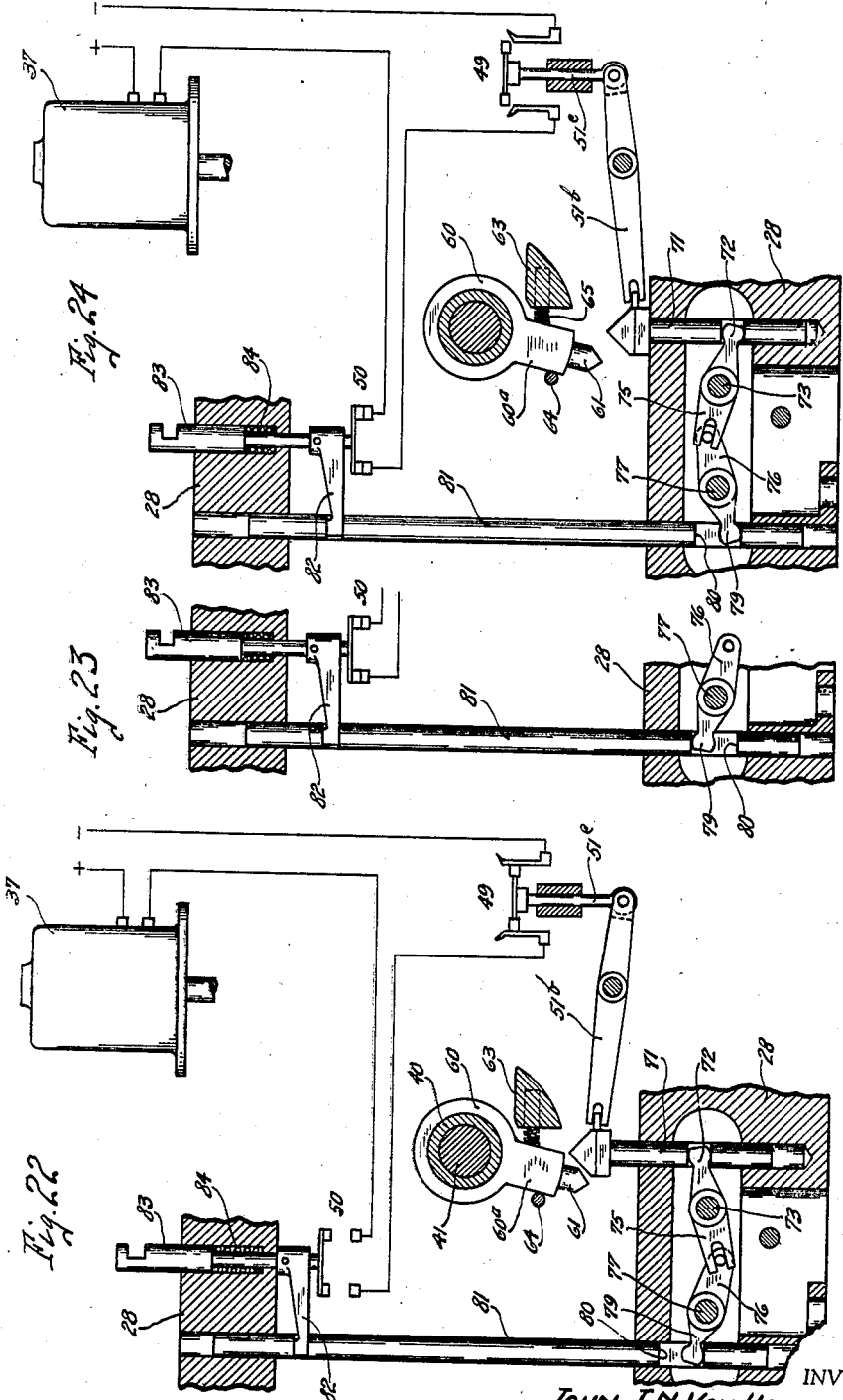

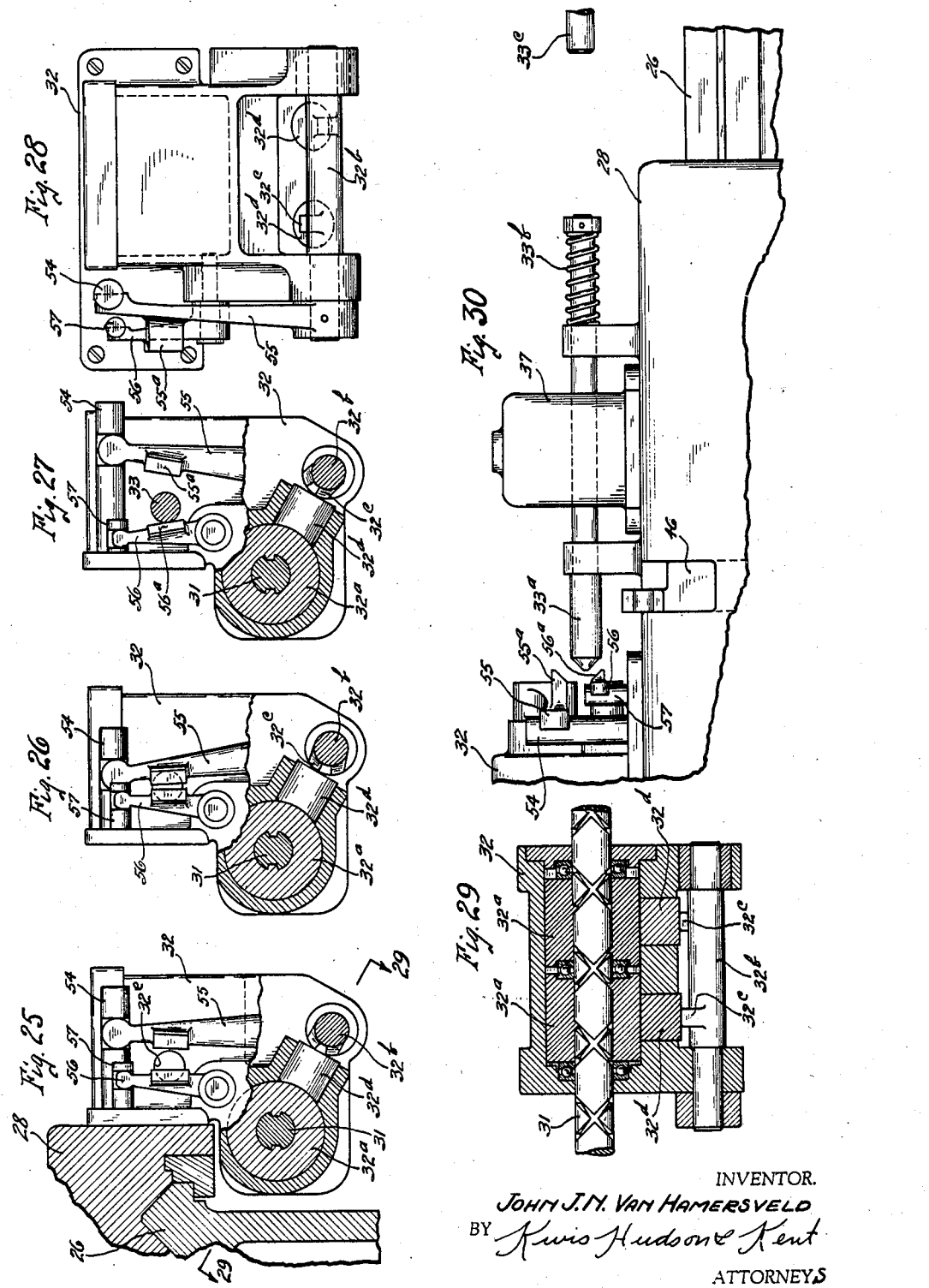

Patented Sept. 9, 1941

2,255,199

UNITED STATES PATENT OFFICE 2,255,199

MACHINE TOOL

John J. N. Van Hamersveld, Cleveland Heights, Ohio, assignor to The Warner & Swasey Company, Cleveland, Ohio, a corporation of Ohio Application February 6, 1939, Serial No. 254,795

23 Claims. (Cl. 29—50)

This invention relates to improvements in indexing mechanisms for machine tools and has particular reference to the indexing of members carrying tools which successively operate on a work piece such, for example, as a rotatable turret.

The principal object of the present invention is to provide a power operated indexing unit which is carried by the movable member which supports the indexible member, which unit includes both the indexing mechanism proper and the motor or source of power which actuates it.

A further object is to provide a novel indexing mechanism per se.

A still further object is to provide an improved form of control for the motor which actuates the indexing mechanism proper.

A further object is to provide a motor control for indexing mechanisms involving two control elements, as, for example, switches, capable of being actuated either automatically or partly automatically and partly manually.

The invention may be further briefly summarized as consisting in certain novel combinations and arrangements of parts and details of construction which will be described in the specification and set forth in the appended claims.

My invention finds particular utility for indexing the rotary turret of a turret lathe, and in the accompanying sheets of drawings I have shown two embodiments of my invention arranged for indexing the turret of a machine tool of the character just stated.

In the accompanying drawings,

Fig. 1 is a front elevation of a turret lathe wherein the slide or saddle which supports the indexible turret also carries the turret indexing mechanism, including the motor or source of power which actuates it;

Fig. 2 is a plan view of the rear portion of the turret lathe shown in Fig. 1, including a portion of the bed, the saddle, the turret, and the turret indexing mechanism;

Fig. 3 is a fragmentary plan view of a portion of Fig. 2 with part of the turret broken away;

Fig. 4 is an enlarged front elevation of a portion of Fig. 1 with a part in section;

Fig. 5 is a fragmentary sectional view substantially along the line 5—5 of Fig. 8;

Fig. 6 is a fragmentary plan view showing the detail of the turret clamp with the turret removed;

Fig. 7 is a detail sectional view of the turret clamp along the line 7—7 of Fig. 9;

Fig. 8 is a horizontal sectional view substantially along the irregular line 8—8 of Fig. 4;

Fig. 9 is a vertical transverse sectional view substantially along the irregular line 9—9 of Fig. 4;

Fig. 10 is a detail sectional view substantially along the line 10—10 of Fig. 8;

Fig. 11 is a detail sectional view substantially along the line 11—11 of Fig. 8;

Figs. 12, 13, and 14 are horizontal sectional views corresponding substantially to the section of Fig. 8 but showing certain of the parts in different relative positions corresponding to different steps in the indexing cycle;

Figs. 15, 16, and 17 are diagrammatic views of the power control with portions in section and with parts of the control in different relative positions corresponding to different steps in the indexing cycle;

Fig. 18 is a horizontal sectional view corresponding to the section of Fig. 8 but with the turret disk removed and showing a modification;

Fig. 19 is a detail vertical sectional view, the section being taken substantially along the line 19—19 of Fig. 18;

Fig. 20 is a detail sectional view substantially along the line 20—20 of Fig. 18;

Fig. 21 is a fragmentary plan view similar to Fig. 6 but with the clamp removed and showing a portion of the modified construction illustrated in Figs. 18, 19, and 20;

Figs. 22, 23, and 24 are diagrammatic views corresponding to Figs. 15, 16, and 17, but embodying the control of the modified construction illustrated in Figs. 18 to 21 inclusive;

Figs. 25, 26, and 27 are views similar to Fig. 11 but with portions broken away to show the interior of the box housing the nuts which co-operate with the right- and left-hand threaded shaft to bring about the rapid traverse of the saddle, and with certain levers in different positions corresponding to different points or steps in the cycle of operations;

Fig. 28 is a detached view of the box referred to in the brief description of Figs. 25, 26, and 27 looking toward the left of Figs. 25, 26, and 27;

Fig. 29 is a sectional view along the line 29—29 of Fig. 25; and

Fig. 30 is a view corresponding to the upper portion of Fig. 8 but showing a modification in the manner of supporting and the maner of operating the knock-out bar which in the preceding figures is shown as being stationarily but adjustably supported on the bed whereas in this figure it is carried by the saddle and is adapted to cooperate with a fixed but adjustable stop carried by the bed.

While I have illustrated my invention applied to the rotatable turret carried by the saddle of a turret lathe, I wish it to be understood that my invention is not confined in its utility to machine tools of this particular type nor to an indexible member which is indexed by rotary movement as in this instance nor to a turret mounted on the saddle, for the indexing member may be given indexing movements of a kind other than that which is usually given to a turret and may be applied to a part of a machine tool other than the saddle, as, for example, the cross-slide carriage.

Referring now to the drawings, 25 represents the bed having ways 26 to accommodate the cross-slide carriage illustrated at 27 and the saddle 28. The lathe herein illustrated also has a head 29 which supports the rotatable work spindle.

The machine here shown is provided with the usual feed shaft 30 for both the cross-slide carriage 27 and the turret saddle 28, but the feed control mechanism for the carriage and the saddle are immaterial to the present invention and need not be further referred to.

The saddle 28 may be moved manually along the ways of the bed by rotating a hand wheel 28a in the manner and by mechanism well known in the art. The saddle may be moved rearwardly to the end of the bed and may be moved forwardly to bring the tools into cutting relation by rotating the hand wheel 28a, but to impart the major movements to the saddle both rearwardly and forwardly I prefer to employ the usual right- and left-hand threaded quick motion shaft 31 extending along the rear side of the bed. This shaft extends through a box 32 which is bolted to the rear side of the saddle and is adapted to impart rapid forward and reverse movements to the saddle by two nuts 32a, one having right-hand threaded engagement with the shaft and the other having left-hand threaded engagement with the shaft, these nuts being located in the box 32 as best shown in Fig. 29.

The action of the shaft 31 and of the nuts 32a is well known in the art, but their function may be briefly stated as follows: If they are both allowed to rotate with the shaft 31, no movement is imparted to the saddle, but if a forward movement is to be imparted to the saddle, one of the nuts is held stationary, and when rearward movement is to be imparted to the saddle the other nut is held stationary. To hold either of the nuts stationary or to release them so that they may rotate with the shaft 31 I employ a rock shaft 32b (see Figs. 25 to 29) which is journaled in the lower part of the box 32 and carries two lugs 32c which are adapted to move radially inward toward and away from the axis of shaft 31 a pair of shoes 32d mounted for slight sliding movement in the body of the box 32. When the rock shaft 32b is swung in one direction, one of the lugs 32c presses the corresponding shoe 32d inward against the periphery of the associated nut 32a and thus holds it stationary, and when the rock shaft is swung in the opposite direction from neutral, the nut last referred to is released and the other nut is held stationary by the other lug 32c and the shoe 32d associated therewith.

The rock shaft 32 is adapted to be shifted in one direction from neutral position to impart a forward quick motion to the saddle and to be rocked in the opposite direction from neutral to impart a rearward rapid movement to the saddle. This is accomplished by providing on one end of the rock shaft 32b a lever 55 (more fully referred to presently) as indicated in Figs. 11 and 28, and this lever is adapted to be engaged by a knock-out rod 33 which is preferably adjustably supported on the bed as indicated in Fig. 2 and utilized for the purpose of stopping the rearward rapid traverse of the saddle at the desired point, depending upon the adjusted position of the rod 33. This rod functions to engage and rock the lever 55 so as to release the particular nut 32a in the box 32 which was instrumental in causing the rearward movement of the saddle.

The knock-out pin 33 is preferably adjustably mounted on the bed, as stated above. However, it may be carried by the saddle 28 in which case it is yieldingly or slidingly supported on the saddle as shown at 33a in Fig. 30 and held in its most rearward position by a spring 33b shown in the same figure. With an arrangement such as illustrated in Fig. 30, just prior to the saddle reaching its rearmost position, the rear end of the knockout rod 33a engages an abutment 33c carried by the bed. Further movement of the rod 33a is stopped but the saddle continues rearwardly for a short distance causing relative movement between the saddle and the rod 33a (against the tension of spring 33b), this relative movement being sufficient to cause the forward end of rod 33a to engage the lever 55 and thus stop the rearward movement of the saddle.

In this instance the indexible part is in the form of a turret 34 which is rotatably mounted to turn about a vertical axis on the saddle 28. The turret may be mounted on the saddle in any desired manner, but in this case the lower surface of the turret rests upon a portion 28b of the saddle 28 with a reduced portion extending through an opening in the saddle, as indicated in Fig. 5. The turret is designed to be clamped to the saddle by a so-called external clamp indicated at 35 with the usual clamping action, and the turret is adapted to be held in each of its several indexed positions by a horizontally movable lock bolt 36. As will be explained presently, the turret indexing mechanism serves to automatically actuate both the clamp 35 and the locking bolt 36.

The turret indexing mechanism embodying the present invention may be aptly referred to as a self-contained unit in the sense that this mechanism, including a suitable motor for actuating it, is all carried by the movable part which supports the indexible member and therefore, in this instance, by the saddle 28. While doubtless different types of motors may be employed for this purpose, I prefer to utilize an electric motor indicated at 37 which motor is in this case of the flanged type and is bolted to the rear side of the saddle 28.

The motor 37 when energized drives a shaft 38 which is rotatably supported by the saddle and extends into a cavity or chamber formed in the saddle (see particularly Fig. 8). This shaft which actuates the indexing mechanism proper is provided with a worm 39 which engages a worm wheel 40 supported on a vertical bearing pin 41 carried by the lower part of the saddle, this worm wheel rotating in a horizontal plane. The worm wheel carries on its upper side a roller 42 forming one element of a Geneva motion, the other element of which is a disk 43 which is secured to the lower side of the turret 34, as best shown in Fig. 5. The disk 43 has a plurality of radial slots 43a equally spaced and corresponding in number to the faces of the turret, in this instance six in number, the slots being on the underside of the disk, as indicated in the drawings. At each revolution of the worm wheel 40 the roller 42 enters one of these slots and turns the disk 43 and therefore the turret through one-sixth of a revolution, thereby giving the turret its indexing movement.

The upper side of the worm wheel 40 is dished or recessed and formed integral with the worm wheel; in this recess is a cam 44 which is adapted to engage and move laterally outward a pin 45 extending downwardly from the lock bolt 36, see particularly Figs. 5, 8, 12, 13, and 14. By the outward movement thus imparted to the pin 45 and therefore to the lock bolt 36, the latter is withdrawn from locking engagement with the turret which locking engagement is in this instance brought about by reason of the fact that the inner end of the lock bolt normally engages in one of a series of sockets 43b formed in the periphery of the disk 43 which, as previously stated, is secured to the underside of the turret.

As will be noted particularly from Figs. 8, 9, 12, 13, and 14 there is arranged over the worm wheel 40 a slidable clamp actuating bar 46 supported on opposite sides of the saddle for actuating the turret clamp 35. This bar has two tapered or cam portions 46a and 46b, one of which faces rearwardly and the other forwardly, as clearly shown in the drawings. These cam faces are so arranged that shortly after the worm wheel starts its rotative movement the roller 42 carried by it engages the cam face 46a and moves the slidable bar 46 toward the front of the machine. The outer rear end of the bar 46 (see particularly Figs. 7 and 9) has a notched portion in which is engaged the lower end of a clamp operating arm 47 secured to a clamp actuating screw 48 having right- and left-hand threaded portions engaging in threaded lugs 35a at the adjacent ends of a split or two-part clamp such as is customarily employed for this purpose. In the movement of the bar 46 just referred to the screw 48 is rotated in a direction such as to spread or open the clamp and thus release the turret for indexing purposes. The movement of the bar 46 in the opposite direction again applies or tightens the clamp so as to bind the turret in the position to which it has been indexed, as will be readily understood.

In Fig. 12 the parts are shown in the positions they occupy at the conclusion of the clamp releasing operation, the roller 42 having just passed over the tapered face 46a of the bar 46. At this moment the cam 44 is on the point of camming laterally outward the pin 45 carried by the lock bolt 36. During the movement of the cam from the position shown in Fig. 12 to the position shown in Fig. 13 the lock bolt is withdrawn and the roller 42 on the worm wheel 40 has been brought to and is just entering one of the radial slots of the disk 43. The turret is next indexed and during this indexing movement the pin 45 rides off the high part of the cam 44 whereupon the spring 36a which acts on the lock bolt 36 as clearly shown in Fig. 5 moves the lock bolt inwardly against the periphery of the disk 43, and as soon as the indexing movement is completed the lock bolt snaps into one of the sockets 43b.

Immediately after the completion of the indexing movement, the roller 42 engages the other cam face 46b of the bar 46 and shifts it laterally toward the rear side of the machine to its previous normal position and thus again moves the clamp 35 to turret-clamping position. Fig. 14 shows the relative positions of the parts at the completion of the clamping operation. The movement of the worm wheel continues until the roller 42 again reaches the position shown in Fig. 8, whereupon the motor circuit will be opened and the motor will be stopped by the control means shortly to be referred to.

In both forms of the invention herein illustrated, two control switches for the motor 37 are utilized. One of these switches is illustrated at 49 and the other at 50 in Figs. 15, 16, and 17. These switches are arranged serially in the motor circuit as indicated in Figs. 15, 16, and 17, and therefore it is necessary that both be closed for the motor to operate, whereas the motor will be stopped when either switch is opened. The manner in which these switches are actuated will be explained presently.

With the construction embodied in one form of my invention now being described, two manually operated actuating or control members are employed, one being in the form of a push rod 51 with a knob at its outer end, this push rod being normally in the position shown in Figs. 8 and 17. The other actuating member is in the form of a lever 52. Both the push rod 51 and the lever 52 are carried by the saddle 28 in convenient location for actuattion by the operator.

It might be here stated that the function of the push rod 51 is to close the switch 49 by moving the switch blade from the position shown in Fig. 17 to the position shown in Figs. 15 and 16 between the stationary contacts of switch 49 while the function of the lever 52 is to initiate the rapid traverse movement of the saddle either forwardly or rearwardly, as the case may be. If the operator swings the lever 52 from neutral position shown in full lines in Fig. 8 to the left-hand dotted line position shown in this same figure, the saddle will be given a forward rapid traverse movement. On the other hand, if the operator swings the lever 52 from neutral position to its right-hand dotted line position the saddle will be given a rearward rapid traverse movement. The push rod 51 need be actuated or moved inwardly by the operator only when the turret is to be indexed. Therefore, when the saddle is moved forwardly to bring the tools up to the work only the lever 52 is actuated. On the other hand, when the tools carried by one face of the turret have completed their cutting function and the saddle and turret are to be returned to the rear of the bed, then the operator will push the rod 51 inwardly and swing the lever 52 from neutral to its right-hand dotted line position shown in Fig. 8. It was previously stated that the function of the push rod 51 is to close the switch 49. The mechanical connection between the push rod 51 and the movable blade of the switch 49 may be anything desired, but in this instance the inner enlarged end 51a of the push rod has a pin which engages in a notch of a lever 51b which is pivoted intermediate its ends and is connected to a switch rod 51c which carries the movable contact blade of the switch.

The lever 52 is mounted on a bearing pin in a socket or pocket on the front face of the saddle, this lever having at its inner end an arm 53 which engages in a notch of a slide bar 54 extending horizontally across the saddle underneath the disk 43. The slide bar 54 extends beyond the rear side of the saddle as indicated in Figs. 8 and 11, and near its rear end it has a notch which receives the upper end of the lever 55 which, as previously stated, controls the engagement of the nuts with the right- and left-hand threaded shaft 31 to cause the rearward or forward rapid traverse of the saddle.

The normal or neutral position of the lever 55 is shown in full lines in Fig. 11, and when the lever 52 is actuated to cause the saddle to move rearwardly, the bar 54 is slid forwardly and, in so doing, the lever 55 is moved from the full line position shown in Fig. 11 to the left-hand dotted line position, and when in this position a camming portion 55a of the lever 55 projects over an opening 32e in the box 32, which opening forms a clearance for the forward end of the knock-out rod 33. Consequently, when the lever 52 is moved from its normal position to the right the rearward rapid traverse of the saddle is initiated, and when the saddle has reached the desired rearward position its movement is stopped by the engagement of the knock-out rod 33 with the camming portion 55a of the lever 55 which is thus restored to its normal or neutral position shown in full lines in Fig. 11, this causing the release of the nut which was previously held stationary to bring about the rearward movement of the saddle. At the same time, the lever 52 is restored to its neutral position.

By reference particularly to Figs. 9 and 11 it will be seen that closely adjacent to the lever 55 is a second lever 56 which is mounted on the face of the box 32. The upper end of this lever fits into a notch in a rod 57 slidably mounted in the saddle and spring-pressed outwardly by a spring 58, its outermost position being determined by a shoulder in the form of a collar 59 engaging a shoulder of the saddle as shown in Figs. 9 and 15. The rod 57 carries a bridging contact member which is adapted to close and open switch 50, as clearly shown in Figs. 15, 16, and 17. The lever 56 has a camming portion 56a which when the lever is in its normal position overlies a portion of the opening 32e in the box 32. When the lever is in this position, illustrated in Fig. 9, the switch 50 is open as in Fig. 15. Consequently, when the saddle reaches its rearmost position determined by the position of the knock-out bar 33, the bar 33 not only shifts the lever 55 to its normal position, i. e., its position to stop the rearward movement of the saddle, but at or about the same time it actuates the lever 56 so as to move it from the position shown in Fig. 9 to the position of Fig. 11, thereby closing the switch 50 by moving the movable contact member of switch 50 from the position shown in Fig. 15 to the position shown in Figs. 16 and 17.

It was previously stated that when the operator desires the turret to be indexed, prior to the actuation of the lever 52, the operator pushes the rod 51 inwardly causing the closure of the switch 49, as indicated in Figs. 15 and 16, and therefore upon the closure of switch 50 in the manner just explained the circuit to the motor is completed and the indexing movement is initiated. It might be pointed out that although the operator closes the switch 49 by moving the rod 51 inwardly before he shifts the lever 52 which moves the saddle to the rear, the indexing movement of the turret cannot be initiated until after the saddle has reached its rearmost position at which time the switch 50 is closed to complete the motor circuit, thus insuring that the tools and the pilot bar which may be carried by the turret are entirely clear of the work and of the pilot bar guide before the indexing movement of the turret is started. It might be noted at this point that the switch 50 remains in closed position only so long as the lever 56 is cammed to its left-hand position as shown in Fig. 11 by the knock-out rod 33, and as soon as the saddle is moved forwardly along the bed, the lever 56 is released from the action of the knock-out rod 33 and the switch 50 is immediately opened by the spring 58 which moves the bar and the movable contact of the switch 50 from the position shown in Figs. 16 and 17 to the position shown in Fig. 15, thus restoring the lever 56 to its normal position shown in Fig. 9.

As stated above, the switch 49 is closed manually and the switch 50 is closed automatically to bring about the energization of the motor 37. To bring about the stopping of the motor at the conclusion of the indexing cycle, i. e., when the roller 42 at the top of the worm wheel 40 has made a complete revolution and has again reached the position shown in Fig. 8, I have provided means for automatically opening the switch 49 and the mechanism for accomplishing this result will now be explained.

Mounted on a dependent sleeve-like portion of the worm wheel 40 and located between the worm wheel proper and a boss on the bottom of the saddle is a cam ring 60 with a laterally projecting portion 60a having a bore which receives a shouldered camming pin or spring point 61 normally urged outwardly by a spring 62. The laterally projecting portion 60a of the cam ring has a limited range of rocking movement on the sleeve-like flange on the lower side of the worm wheel between two abutments which are carried by the lower side of the worm wheel, one being in the form of a lug 63 and the other a depending pin 34. The relationship of these parts is perhaps most clearly illustrated in Figs. 15, 16, and 17. The lug 63 has a bore containing a spring 65 which normally presses against the laterally extending portion 60a of the cam ring and tends to hold it over against the pin 64. Normally the parts just described are in the relative positions shown in Fig. 15 except, however, that the push rod is during such time in the position shown in Figs. 8 and 17. The enlargement 51a of the push rod 51 has a tapered forward or inner end but when the push rod is moved inwardly to the position shown in Fig. 15 the tapered end has no effect on the spring point 61 as it is to one side of the same so that the sole function of moving the push rod 51 inwardly is to close the switch 49, as already pointed out.

During the rotation of the worm wheel which brings about the indexing of the turret, the parts carried thereby including the lug 63, the pin 64, and the spring point and the part which houses it are given a complete rotation in a clock-wise direction indicated by the arrow with the last-mentioned parts remaining in the relative positions shown in Fig. 15, but as the worm wheel is about to complete its revolution, the spring point 61 engages the tapered forward end of the enlargement 51a of the push rod 51. The first effect of this engagement is to bring the laterally extending portion 60a of the cam ring 60 up against the face of the lug 63 while the spring 65 is compressed, and as soon as this occurs, the spring point cams the push rod outwardly to its normal outward position shown in Fig. 17 where the parts are shown just at the instant that the outward movement of the push rod has been completed. The effect of this is to open the switch 49 but when this occurs, i. e., when the point of the spring point is on the point of the enlargement 51a the spring 65 pushes the laterally extending portion 60a of the cam ring over against the pin 64 to the position shown in Fig. 15, thus making it possible for the operator to again move the push rod 51 inwardly at the start of the next indexing cycle without interfering with or being interfered with by this spring point.

Thus it will be seen that in the cycle of operations the switch 49 is closed manually and the switch 50 is closed automatically when the saddle reaches its rearmost position, and of course they both remain closed during the indexing movement, but after the turret has been indexed and near the completion of the rotary movement of the worm wheel the switch 49 is automatically opened in the manner just explained, thus stopping the motor. However, the switch 50 remains closed until the saddle is again moved forwardly and is then automatically opened when the lever 56 controlling the switch 50 is released from the knock-out rod 33 and is permitted to move back to its normal position under spring pressure acting on the rod 57.

In the above description it is assumed that tools will be provided on each face of the turret or that the six faces of the turret will be brought successively into position facing the head. However, it is sometimes the case that the tools cannot or need not be mounted on all faces of the turret, and in such instances it is desirable that the turret be given uninterruptedly two or more indexing motions. This is made possible with the mechanism herein illustrated by providing means for automatically preventing the outward movement of the push rod 51 near the completion of the rotation of the worm wheel, resulting in the continued operation of the motor through two or more indexing cycles.

To attain this result I mount in the front part of the saddle a vertical rock shaft 66 which is supported in a bracket 67 secured to the saddle, this rock shaft having at its lower end a lever arm 68 the outer end of which is in a notch of the push rod 51, as clearly shown in Figs. 8, 15, 16, and 17. The upper end of this rock shaft carries a lever 69 which is moved in and out toward and away from the lower circular part of the turret, i. e., to and from the positions shown in Figs. 6 and 3. When the push rod is in its outer position shown in Fig. 8, the lever 69 is in the position shown in Fig. 6, and when the push rod is in its inner position shown in Figs. 15 and 16, the lever 69 is in its outer position shown in Fig. 3.

In order to prevent the stopping of the motor at the completion of an indexing cycle to provide an additional indexing movement for one or more faces of the turret, I provide on the lower circular part of the turret one or more stop plates 70, one being shown in Fig. 3, so positioned on the turret as to prevent the lever 69 from moving inwardly at the end of the first indexing cycle and therefore prevent the outward movement of the push rod 51 and the opening of the switch 49. The result is that the motor continues to operate and the worm wheel is rotated through one or more additional revolutions. Should it be desired to skip two faces of the turret, two of these stop plates are employed, in which case the worm wheel will make three complete revolutions before the motor is stopped. In these instances the spring point 61 is incapable of moving the push rod 51 outwardly since the rock shaft 66 cannot rotate by reason of the engagement of the lever 69 with the stop plate 70, and in such cases when the spring point passes the tapered inner end of the push rod instead of camming the push rod outwardly the spring point 61 is in turn cammed inwardly into the socket, thus compressing the spring 62. Then of course after the spring point has passed the tapered inner end of the push rod 51 the spring point is again moved outwardly to its normal position shown in Fig. 15.

In the modified construction illustrated in Figs. 18 to 24, inclusive, the same results are obtained as before described with the use of only one manually operated member which in this instance is the lever 52, the need for extending the push rod 51 through the front wall of the saddle and providing it with a knob being eliminated. With this modified construction two motor control switches are utilized as before, both switches being in this instance automatically controlled and the timing of their operations being made possible through novel mechanical connection between them.

With this modified construction I employ as before the lever 52 which is connected to the slide bar 54 which at its rear end is connected to the lever 55 (shown in plan view only in Fig. 18) precisely as in the construction first described, the function of this lever and the parts referred to in connection with the rapid traverse movement being precisely as before described. Likewise, the mechanism for indexing the turret and for operating the clamp and the lock bolt will be precisely as before, and these parts will be operated as in the first instance by the motor which will be geared as first described to the worm wheel 40 with its cam 44, spring point 61, and the abutments between which the spring point arm is adapted to move. As these parts correspond precisely with the parts of the first construction, a detailed description of them need not be given, and corresponding parts in the two constructions will be given the same reference characters. In place of the push rod 51 I employ a cam rod 71 which is slidably mounted in the front wall of the saddle but is not extended through the front wall and is not provided with a knob as stated above. The inner end of this cam rod is enlarged and is tapered and it is connected to the switch 49 in precisely the same manner as in the construction first described, see Figs. 22, 23, and 24. Its inner tapered end is also related in the same manner as before to the spring point 61.

The cam rod 71, like the push rod 51 of the first construction, is notched out and receives the outer end of an arm 72 which is fixed to a vertical rock shaft 73 which corresponds to the rock shaft 66 of the first construction, this rock shaft having at its upper end an arm 74 which is similar in function to the arm 69 of the first construction and is adapted to cooperate with a stop plate 70 on the turret in the same manner as previously described. Additionally, the rock shaft 73 has a third arm 75 which is connected by a pin and slot connection with an arm 76 carried by a bearing pin 77 journaled in a bracket 78 on the saddle (see Figs. 19 and 21). The bearing pin 77 has a second arm 79, the outer end of which fits into an elongated slot 80 of an actuating bar 81 slidably mounted in the front and rear walls of the saddle and extending parallel to the slide bar 54. Near its rear end the actuating bar 81 has a notch which receives the end of an arm 82 which is fixed to the inner end of a rod 83 which corresponds to the rod 57 of the first construction. A spring 84 normally tends to move the rod 83 to its outer or rear position shown in Fig. 18, as is the case with the spring 58 of the first construction. The outer end of rod 83 is notched and receives the upper end of the lever 56 which is the same as the lever 56 of the first construction and functions as before with respect to the knock-out rod 33. The inner end of the rod 83 carries the movable contact blade of a switch 50 identical with the switch 50 first described.

Normally, the parts are positioned as shown in Figs. 18 and 22 with the switch 49 closed and the switch 50 open. Assuming that the tools have completed their cutting operation and that the operator desires the saddle to be given its rapid rearward movement and the turret to be given an indexing movement, he will throw the lever 52 to the right as before, and this will result in the lever 55 being rocked to hold stationary one of the nuts in the box 32 as before. When the saddle reaches its rearmost position, the knock-out rod 33 will move the lever 55 to its neutral position and thus release the nut and stop the rearward movement of the saddle, and at the same time through the slide 54 will restore the lever 52 to its neutral position. Simultaneously, the knock-out rod moves the lever 56 to its full line position shown in Fig. 11, and this will move the rod 83 inwardly and close switch 50 moving the contact blade of the switch from the position shown in Fig. 22 to the position shown in Figs. 23 and 24. When the rod 83 is moved inwardly it moves the actuating bar 81 forwardly, but this movement of the bar has no effect whatsoever on the lever arm 79 due to the wide slot 80, the slot now being in a position in relation to the lever arm 79 as shown in Fig. 23.

Since the switch 49 was previously closed, the closure of the switch 50 causes the motor to start and the worm wheel 40 is given its revolution, thus bringing about the indexing of the turret. Near the end of its revolution, the spring point 61 comes into action and moves the cam rod 71 to the position shown in Fig. 24, resulting in the opening of the switch 49 and the stopping of the motor. The shifting of the cam rod by the action of the spring point to the position shown in Fig. 24 has moved the lever arm 79 from the position shown in Fig. 23 to the position shown in Fig. 24, thus contacting with the shoulder at the forward or outer end of the relatively long slot 80 of the actuating bar 81. The indexing is now completed but the saddle stands at the rear end of the bed and the switch 50 at this time remains closed due to the action of the knock-out rod. However, as soon as the saddle is again moved forwardly, the lever 56, as before, is relieved of the action or effect of the knock-out rod and the spring 84 immediately moves the rod 83 rearwardly to the position shown in Fig. 22, thus opening switch 50 and at the same time moving the actuating bar 81 from the position shown in Fig. 24 to the position shown in Fig. 22, this movement through the lever arms connecting the slide bar 81 with the cam rod 71 moving the latter from the position shown in Fig. 24 to the position shown in Fig. 22, thus again closing switch 49. It is to be noted that, as the saddle starts forward, the switch 50 is opened and switch 49 is closed, these two switches being thus operated automatically and simultaneously. Thus the parts are positioned ready for the next indexing operation.

If it is desired that two or more indexing operations be given to the turret uninterruptedly for the reasons previously explained, this can be accomplished by the provision of one or more stop plates which will cooperate with the arm 74 which is provided at the upper end of the rock shaft 73.

Thus it will be seen that I have provided a self-contained or unitary indexing mechanism in the sense that the motor, the indexing mechanism operated by it, and all parts of the control are carried by the part of the machine tool which supports the indexible member.

Likewise, it will be seen that the mechanism which I have provided and particularly the control mechanism is novel and very effective, this control mechanism including two motor control elements, in this instance electric switches, both of which must be closed to start the motor and one of which is opened to stop the motor. It will be seen also that with one form of my invention one of these switches is closed manually and opened automatically while the other switch is both opened and closed automatically while in the other form of my invention both switches are opened and closed automatically. With one form two manually operated devices are utilized and in the other form a single manually operated device is employed for the purpose of bringing about the backward and forward movement of the saddle with its turret, the releasing and clamping and the unlocking and locking of the turret, and the indexing of the turret through one or more indexing cycles depending upon the number of faces of the turret to which tools are applied.

In conclusion it might be stated that while power operated indexing mechanisms have been proposed heretofore, so far as I am aware they are not of the self-contained type as herein contemplated but involve a cam drum or the like which is mounted on the bed independently of the part which carries the indexible member, this type of power operated indexing being utilized on the so-called automatic machines.

Furthermore, in many machine tools even this last mentioned type of power operated indexing mechanism is not adaptable, as, for example, in the very commonly employed manually operated and controlled machine tools such as turret lathes wherein the operator is required to perform the following manual operations: (1) Move the quick motion lever to return the slide or saddle to its rearmost position; (2) move the mechanism for unlocking and unbinding the turret; (3) index the turret by hand to bring the next group of tools to cutting position; (4) restore the locking and binding members to their former positions to again lock and bind the turret; and (5) move the quick motion lever for the forward movement of the saddle to position the tools close to the work. My improvements which are adaptable to hand operated machine tools greatly reduce the number of manual operations or manual manipulations of the control members to accomplish the results mentioned above since it is only necessary for him, with one form of my invention, to push in a knob to close one of the control switches and then move the quick motion lever to start the slide or saddle on its rearward movement and later to again move the quick motion lever for forward movement while in the other form of the invention it is only necessary for him to move the quick motion lever to start the slide or saddle on its rearward movement and later to again move the quick motion lever for forward movement. It is to be understood that with my improvements when the slide or saddle reaches its rearmost position the motor is started, the turret is automatically unlocked and unclamped, and the turret is then indexed with one or more indexing cycles, and again locked and clamped, and the motor is automatically stopped and the control element restored to its former position. While these operations are being performed automatically, the operator can do other work as, for example, load or unload the machine or adjust the tools in the cross slide, position the cross slide and engage the power feed for the cross slide tool. It is only necessary for him to again shift the quick motion lever to start the forward movement of the slide or saddle to bring the newly indexed turret tools into cutting position. Furthermore, with the second form of my invention these operations are still further reduced and greater efficiency obtained by reason of the fact that it is only necessary for the operator to operate or manipulate the quick motion lever for the turret slide or saddle.

It will be seen therefore that the objects of the invention stated in the early part of the specification are attained very effectively by the two forms of the invention herein illustrated. However, I do not desire to be confined to the specific mechanisms herein disclosed as other ways of carrying out the principle of the invention may be employed. Likewise, I do not desire to be confined to any particular form of machine tool, to any particular form of slide, or to any particular form of indexible member supported by the slide, or to the particular form of motor herein illustrated utilizing control switches. I therefore aim in my claims to cover all modifications which do not involve a departure from the spirit and scope of the invention as defined in the appended claims.

Having thus described my invention, I claim:

1. A machine tool having a slide, an indexible member supported by the slide, and power operated mechanism for indexing said member and including a normally inactive electric motor and switch means for rendering said motor active to index the indexible member, said motor and said switch means both being carried by said slide.

2. In a machine tool, a slide, an indexible member carried thereby, locking means for the indexing member, and power operated mechanism for actuating the locking member and for indexing the indexible member and including a single normally inactive motor carried by the slide and control means also carried by the slide for rendering said motor active to actuate the locking member and index the indexible member.

3. In a machine tool, a slide, an indexible member carried by the slide, a clamp for the indexible member, and power operated mechanism embodying means for actuating the clamp and for indexing the indexible member and including a normally inactive electric motor and switch means for rendering said motor active to index the indexible member and actuate the clamp, said motor and said switch means both being carried by said slide.

4. In a machine tool, a bed, a slide supported by the bed, an indexible member carried by the slide, a lock bolt and a clamp for the indexible member, and power operated mechanism for actuating the lock bolt and the clamp and for indexing the indexible member and including a normally inactive motor carried by the slide and control means also carried by the slide for rendering said motor active to actuate the lock bolt and the clamp and to index the indexible member.

5. In a machine tool, a bed, a slide supported by the bed, an indexible member carried by the slide, power operated indexing mechanism for the indexible member including a normally inactive electric motor carried by the slide, and two interdependent control switches also carried by the slide for rendering said motor active to index the indexible member.

6. In a machine tool, a bed, a slide supported by the bed, an indexible member carried by the slide, power operated indexing mechanism for the indexible member including an electric motor carried by the slide, and two inter-dependent control switches for the motor and carried by the slide, at least one of said control switches being actuated by the movement of the slide on the bed.

7. In a machine tool, a bed, a slide movable back and forth along the bed, a turret carried by the slide, means for moving the slide back and forth along the bed, power means including an electric motor carried by the slide for indexing the turret, and a motor control including a switch carried by the slide and means automatically operable when the slide reaches a predetermined position for closing said switch and starting the operation of the motor.

8. In a machine tool, a bed, a slide movable back and forth along the bed, a turret carried by the slide, means for moving the slide back and forth along the bed, mechanism including a motor carried by the slide for indexing the turret, and a motor control including a member carried by the slide and means for actuating the same when the slide reaches a predetermined position for starting the operation of the motor and a second control member carried by the slide and means for actuating the same by the indexing mechanism to stop the motor.

9. In a machine tool, a bed, a saddle movable lengthwise of the bed, power operated means for moving the saddle forwardly and rearwardly, a turret carried by the saddle, power means including a motor for indexing the turret, a manually operable member for controlling the movement of the saddle, and a control member for the motor automatically operated when the saddle reaches its rearmost position to start the motor.

10. In a machine tool, a bed, a saddle movable lengthwise of the bed, power operated means for moving the saddle forwardly and rearwardly, a turret carried by the saddle, power means including a motor for indexing the turret, a manually operable member for controlling the movement of the saddle, a control member for the motor automatically operated when the saddle reaches its rearmost position to start the motor, a second control member for the motor, and means whereby said second control member is operated to stop the motor at the completion of the indexing cycle.

11. In a machine tool, a bed, a saddle movable lengthwise of the bed, power means for shifting the saddle, a turret carried by said saddle, a lock bolt and a clamp for the turret, power operated means including a motor for operating the lock bolt and the clamp and for indexing the turret, and two control members for the motor one operated to start the motor when the saddle has reached a predetermined position and the other operated by the indexing mechanism to stop the motor at a predetermined point in the indexing cycle.

12. In a machine tool, a bed, a saddle movable lengthwise of the bed, a turret mounted on the saddle, an electric motor, means adapted to be actuated by the motor for indexing the turret, a pair of switches for controlling the motor, means whereby one of said switches is actuated by the movement of the saddle, and means whereby the other switch is actuated by the indexing mechanism.

13. In a machine tool, a bed, a saddle movable lengthwise of the bed, a turret carried by the saddle, a lock bolt and a clamp for the turret, a motor, an operative indexing connection between the motor and the turret including a rotary member connected with the turret, means operated by said rotary member for actuating the lock bolt and for operating the clamp, a switch for stopping the motor, and means actuated by said rotary member for actuating said switch to stop the motor at the completion of the indexing cycle.

14. In a machine tool, a bed, a saddle movable lengthwise of the bed, a turret carried by the saddle, a lock bolt and a clamp for the turret, a motor, an operative indexing connection between the motor and the turret including a rotary member connected with the turret, means operated by said rotary member for actuating the lock bolt and for operating the clamp, two switches for controlling the motor, means whereby one of said switches is actuated as the saddle reaches a predetermined position to start the motor, and means actuated by said rotary member for actuating the other switch to stop the motor at the completion of the indexing cycle.

15. In a machine tool, a slide, an indexible member carried thereby, locking means for the indexible member, and power operated mechanism including a single actuator for actuating the locking member and for indexing the indexible member, a normally inactive motor carried by the slide, and control means for rendering said motor active to drive said actuator to actuate the locking member and index the indexible member.

16. In a machine tool, a bed, a slide supported by the bed, an indexible member carried by the slide, a lock bolt and a clamp for the indexible member, power operated mechanism including a single actuator for actuating the lock bolt and the clamp and for indexing the indexible member, and a motor carried by the slide for driving said actuator.

17. In a machine tool, a bed, a slide movable on the bed, an indexible turret carried by the slide, a lock bolt and a clamp for the turret, a motor carried by the slide, and an operative indexing connection between the motor and the turret including a movable member connected with the turret, means operated by said movable member for actuating the lock bolt and for operating the clamp, control means for said motor, and means actuated by said movable member for actuating said control means to stop the motor at the completion of the indexing cycle.

18. In a machine tool, a bed, a slide movable on said bed, a turret carried by the slide, a lock bolt and a clamp for the turret, a motor carried by the slide, an operative indexing connection between the motor and the turret including a movable member connected with the turret, means operated by said movable member for actuating the lock bolt and the clamp to unlock and unclamp or lock and clamp the same, control means for stopping said motor, and means actuated by said movable member for actuating said control means at the completion of the indexing cycle.

19. In a machine tool, a bed, a slide movable thereon, a turret on said slide and indexible to a plurality of different indexed positions, power mechanism for automatically indexing said turret at the limit of movement of said slide in one direction and including a motor carried by said slide, and means for controlling said mechanism to automatically index said turret one indexible position or a successive number of indexible positions at a time.

20. In a machine tool, a bed, a slide movable thereon, a turret mounted on the slide, means for indexing the turret including a motor carried by the slide, a pair of control members for said motor, means actuated by the movement of the slide for operating one of said control members to start said motor, means actuated by the indexing means to operate the other of said control members for stopping the motor after indexing movement, and means effective at predetermined points in the complete indexing cycle to render said last named means inactive to cause said turret to be indexed through a successive number of indexing positions.

21. In a machine tool, a bed, a slide movable thereon, a turret mounted on the slide and indexible when said slide is at a predetermined point in its movement, means for moving said slide to turret indexing position, mechanism for indexing said turret and including a motor carried by said slide, control means for starting said motor, means for automatically stopping said first named means when said slide has reached turret indexing position, and means operatively associating said last named means with said control means for automatically operating the latter to start said motor when the slide has reached turret indexing position.

22. In a machine tool, a bed, a slide movable thereon, an indexible member mounted on said slide, means for indexing said member including a motor carried by the slide, a pair of control members interdependently controlling said motor, manual means for moving one of said control members to active position, means associated with said indexible member for moving said control member to inactive position, and means associated with said slide and controlled by the movement thereof for moving the other control member to and from active position.

23. In a machine tool, a bed, a slide movable thereon, an indexible member mounted on said slide, means for indexing said member including a motor carried by the slide, a pair of control members interdependently controlling said motor, means controlled by said indexible member for moving one of said control members to inactive position, and means controlled by the movement of said slide for moving said one control member to active position and the other of said control members to both active and inactive positions.

JOHN J. N. VAN HAMERSVELD